United States Patent
Tang

(10) Patent No.: US 11,632,772 B2
(45) Date of Patent: Apr. 18, 2023

(54) METHOD FOR RESOURCE ALLOCATION AND APPARATUS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/219,652

(22) Filed: Mar. 31, 2021

(65) Prior Publication Data

US 2021/0219311 A1 Jul. 15, 2021

Related U.S. Application Data

(63) Continuation of application No. 16/932,346, filed on Jul. 17, 2020, now Pat. No. 10,999,859, which is a
(Continued)

(51) Int. Cl.
*H04W 72/12* (2009.01)
*H04W 8/24* (2009.01)
(Continued)

(52) U.S. Cl.
CPC ......... *H04W 72/1242* (2013.01); *H04W 8/24* (2013.01); *H04W 72/0446* (2013.01);
(Continued)

(58) Field of Classification Search
CPC ............... H04W 72/1242; H04W 8/24; H04W 72/0446; H04W 72/0453; H04W 72/10;
(Continued)

(56) References Cited

U.S. PATENT DOCUMENTS

2017/0257876 A1 9/2017 Loehr et al.
2018/0049193 A1 2/2018 Belleschi et al.
(Continued)

FOREIGN PATENT DOCUMENTS

CN 102547871 A 7/2012
CN 106211331 A 12/2016
(Continued)

OTHER PUBLICATIONS

Corrected Notice of Allowability dated Apr. 2, 2021 of U.S. Appl. No. 16/932,346, filed Jul. 17, 2020.
(Continued)

*Primary Examiner* — Gbemileke J Onamuti
(74) *Attorney, Agent, or Firm* — Perkins Coie LLP

(57) ABSTRACT

A method for resource allocation and an apparatus in a communication device are provided. The method includes that: a sidelink logical channel with high priority is selected from sidelink logical channels belonging to a target address, where the priority of the logical channel is associated with a ProSe Per Packet Priority (PPPP) and the logical channel with high priority is associated with high PPPP; resources are allocated for data in the sidelink logical channel with the high priority; and data transmission is performed between UEs based on the allocated resources.

20 Claims, 3 Drawing Sheets

Related U.S. Application Data continuation of application No. PCT/CN2018/079188, filed on Mar. 15, 2018.

(51) Int. Cl.

| | | |
|---|---|---|
| *H04W 72/04* | (2009.01) | |
| *H04W 72/10* | (2009.01) | |
| *H04W 72/14* | (2009.01) | |
| *H04W 74/08* | (2009.01) | |
| *H04W 72/0446* | (2023.01) | |
| *H04W 72/0453* | (2023.01) | |
| *H04W 92/18* | (2009.01) | |

(52) U.S. Cl.
CPC ....... *H04W 72/0453* (2013.01); *H04W 72/10* (2013.01); *H04W 72/14* (2013.01); *H04W 74/0808* (2013.01); *H04W 92/18* (2013.01)

(58) Field of Classification Search
CPC .. H04W 72/14; H04W 74/0808; H04W 92/18
USPC ........................................................ 370/329
See application file for complete search history.

(56) References Cited

U.S. PATENT DOCUMENTS

| | | |
|---|---|---|
| 2018/0139769 A1 | 5/2018 | Lee et al. |
| 2019/0053251 A1 | 2/2019 | Loehr et al. |
| 2019/0124015 A1 | 4/2019 | Loehr et al. |
| 2020/0146040 A1 | 5/2020 | Lee et al. |
| 2020/0351212 A1 | 11/2020 | Loehr et al. |
| 2021/0250302 A1 | 8/2021 | Loehr et al. |

FOREIGN PATENT DOCUMENTS

| | | |
|---|---|---|
| CN | 106470387 A | 3/2017 |
| CN | 107645710 A | 1/2018 |
| EP | 3244677 A1 | 11/2017 |
| EP | 3273634 A1 | 1/2018 |
| WO | 2016175639 A1 | 11/2016 |
| WO | 2018030396 A1 | 2/2018 |

OTHER PUBLICATIONS

First Office Action of the Japanese application No. 2020-549030, dated Feb. 4, 2022. 6 pages with English translation.
LG Electronics Inc, "De-prioritization of duplicated transmission for V2X sidelink communication", 3GPP TSG-RAN WG2 #101 R2-1802732, Athens, Greece, Feb. 26-Mar. 2, 2018. 2 pages.
Office Action of the Indian application No. 202017042963, dated Dec. 2, 2021. 6 pages with English translation.
OPPO, "Carrier selection in CA-based eV2x", 3GPP TSG-RAN2 Meeting #101 R2-1801852, Athens, Greece, Feb. 26-Mar. 2, 2018. 4 pages.
International Search Report in the international application No. PCT/CN2018/079188, dated Nov. 29, 2018.
LG Electronics, etc., WF on carrier selection rule and resource selection procedure for mode 4 CA, 3GPP TSG RAN WG1 Meeting #91, R1-1721139, Nov. 27-Dec. 1, 2017.
ZTE, Sanechips, Carrier selection and resource selection in SL CA, Discussion, 3GPP TSG RAN WG1 Meeting #91 R1-1719654, Nov. 27-Dec. 1, 2017.
LG Electronics, Discussion on carrier aggregation in sidelink mode 4 operation, Discussion and decision, 3GPP TSG RAN WG1 Meeting #91 R1-1719866, Nov. 27-Dec. 1, 2017.
Samsung, Mode-4 support in V2X CA, Discussion and Decision, 3GPP TSG RAN WG1 #91 R1-1720249, Nov. 27-Dec. 1, 2017.
Written Opinion of the International Search Authority in the international application No. PCT/CN2018/079188, dated Nov. 29, 2018.
OPPO: "Packet duplication in CA-based eV2x",3GPP Draft; R2-1801856—Packet Duplication in CA-Based EV2X, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 15, 2018 (Feb. 15, 2018), XP051399367, Retrieved from the Internet: URL: http://www.3gpp.org/ftp/tsg%5Fran/WG2%5FRL2/TSGR2%5F101/Docs/[retrieved on Feb. 15, 2018] paragraph [2.1.2].
Supplementary European Search Report in the European application No. 18909916.1, dated Jan. 13, 2021.
First Office Action of the U.S. Appl. No. 16/932,346, dated Sep. 14, 2020.
Notice of Allowance of the U.S. Appl. No. 16/932,346, dated Jan. 6, 2021.
First Office Action of the Chinese application No. 202010575905.7, dated Nov. 1, 2022. 11 pages with English translation.
European Search Report in the European application No. 22188206.1, dated Dec. 13, 2022. 10 pages.
First Office Action of the Korean application No. 10-2020-7028790, dated Dec. 16, 2022. 14 pages with English translation.

METHOD FOR RESOURCE ALLOCATION AND APPARATUS

CROSS-REFERENCE TO RELATED APPLICATION

This application is a continuation application of U.S. application Ser. No. 16/932,346 filed on Jul. 17, 2020, which is a continuation application of International Application No. PCT/CN2018/079188 filed on Mar. 15, 2018, the contents of which are hereby incorporated by reference in their entireties.

TECHNICAL FIELD

The present invention relates to the field of information processing technologies, and in particular, to a method for resource allocation and an apparatus in a communication device.

RELATED ART

An Internet of Vehicles system is a sidelink (SL) transmission technology based on LTE-D2D, and has higher spectral efficiency and a lower transmission delay. In 3GPP Rel-14, an Internet of Vehicles technology (V2X) is standardized, and two transmission modes, namely, a mode 3 and a mode 4, are defined. In the mode 4, a vehicle terminal uses a sensing+reservation transmission manner. The vehicle terminal obtains an available transmission resource set in a resource pool through sensing. The terminal randomly selects a resource from the set to transmit data. In Rel-15, eV2X is extended to a multicarrier scenario, that is, UE may simultaneously receive and transmit data on more than one carrier. This leads to a problem of how to perform carrier selection.

DETAILED DESCRIPTION

To understand features and technical content of embodiments of the present invention in more detail, the following describes implementations of the embodiments of the present invention in detail with reference to the accompanying drawings. The accompanying drawings are merely for reference and description, and are not intended to limit the embodiments of the present invention.

Embodiments of the present invention provide a carrier selection method, UE, and a computer storage medium.

A carrier selection method provided in an embodiment of the present invention is applied to UE, and the method includes:

selecting, for target data, a resource on a target carrier according to a first preset criterion, where the first preset criterion includes at least, preferentially selecting the resource for high-priority target data; and performing data transmission between UEs based on the selected resource of the target carrier.

UE provided in an embodiment of the present invention includes:

a processing unit, configured to select, for target data, a resource on a target carrier according to a first preset criterion, where the first preset criterion includes at least: preferentially selecting the resource for high-priority target data; and a communications unit, configured to perform data transmission between UEs based on the selected resource of the target carrier.

UE provided in an embodiment of the present invention includes, a processor and a memory configured to store a computer program executable on the processor, where the processor is configured to perform the steps of the foregoing method when running the computer program.

A computer storage medium provided in an embodiment of the present invention stores a computer executable instruction, and when executed, the computer executable instruction implements the steps of the foregoing method.

In the technical solutions of the embodiments of the present invention, resource selection can be performed for target data according to a priority of the target data, and then data transmission between UEs is performed on a selected resource of a carrier. In this way, a problem of how to receive and transmit data when UE performs multi-carrier data transmission can be resolved.

Embodiment 1

Figure 1:
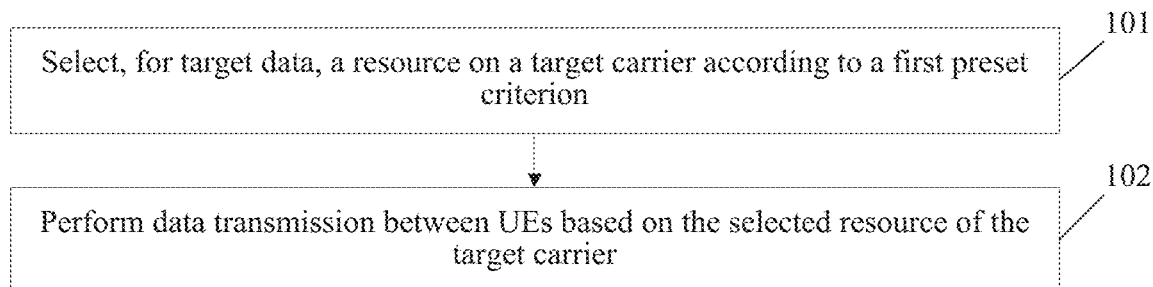
FIG. 1 is a schematic flowchart of a carrier selection method according to an embodiment of the present invention.

This embodiment of the present invention provides a carrier selection method, applied to UE. As shown in FIG. 1, the method includes the following steps:

Step 101: Select, for target data, a resource on a target carrier according to a first preset criterion, where the first preset criterion includes at least: preferentially selecting the resource for high-priority target data.

Step 102: Perform data transmission between UEs based on the selected resource of the target carrier.

There may be at least one piece of target data. That is, there may be a plurality of pieces of target data, and a quantity of the target data is not described in detail herein.

Further, a manner of determining a priority of the target data may include at least one of the following:

for two logical channels for which a PDCP copy operation is performed, data of a first logical channel is used as higher-priority data, and data of a second logical channel is used as lower-priority data;

data corresponding a target address including a logical channel associated with a high data packet priority (ProSe per packet priority (PPPP)) has a high priority; and at the target address, data corresponding to the logical channel associated with the high data packet priority PPPP has a high priority.

Specifically, the high priority may be represented by using a PPPP, that is, a lower PPPP value represents a higher priority.

The high priority may be represented by using copying/non-copying data. That is, for a specific bearer for performing a PDCP copy operation (that is, the bearer is divided into two logical channels, serving two PDCP PDU copies of the bearer). Only after to-be-transmitted data of one logical channel is completely allocated, data is allocated to the other logical channel. The UE determines a first logical channel and a second logical channel in the two logical channels. Priorities of the two logical channels may be determined according to whether there is to-be-transmitted data in a logical channel. For example, a logical channel in which there is to-be-transmitted data may be defined as a high-priority logical channel; otherwise, defined as a low-priority logical channel.

That is, after a user allocates a first carrier set to to-be-transmitted data of one logical channel having a high priority, the user may allocate, from carriers outside the first carrier set, a carrier to to-be-transmitted data of the other logical channel having a low priority.

That the target address of a high-priority logical channel corresponds to high-priority data may be determined according to priorities of different target addresses. In addition, at each target address, there may be logical channels having different priorities. A priority of target data is determined based on a priority of a logical channel.

In that data corresponding a target address including a logical channel associated with a high data packet priority PPPP has a high priority, a logical channel associated with a data packet priority means that each logical channel is associated with one data packet priority value PPPP. Such an association relationship is determined by the UE, and different logical channels may be associated with a same PPPP. The high data packet priority PPPP means that a lower PPPP value represents a higher priority.

When carrier selection is performed, a carrier is selected according to a particular condition. The first preset criterion further includes at least one of the following:

a Channel Busy Ratio (CBR) measurement value of the target carrier being less than a threshold;

the target carrier being capable of carrying a data packet priority PPPP value of the target data;

the target carrier being capable of carrying a service of the target data;

a CBR value of the target carrier being less than a current CBR measurement value and a CBR threshold corresponding to the data packet priority PPPP value of the current target data; and a quantity of resource grants on the target carrier being less than a resource grant quantity threshold.

Certainly, there may be other criteria, which are not enumerated in this embodiment.

Further, during the selecting a resource on a target carrier according to a first preset criterion, the method further includes:

selecting, for low-priority data, a first resource on a first carrier, and subsequently selecting, for high-priority data, a second resource on a second carrier.

Correspondingly, the method further includes: determining whether the first resource and the second resource are in conflict; and if the second resource is in conflict with the first resource, preferentially transmitting the second resource, and discarding the first resource.

That is, a sequence of resource allocation performed on high-priority or low-priority target data may be set according to an actual situation. The manner described above is a manner in which the low-priority data is allocated a resource first and then the high-priority data is allocated a resource. In this manner, whether the two resources are in conflict needs to be further determined. If the two resources are in conflict, a low-priority resource needs to be discarded, and a high-priority resource is transmitted.

Another manner is: selecting, for high-priority data, a first resource on a first carrier, and subsequently selecting, for low-priority data, a second resource on a second carrier that is not in conflict with the first resource on the first carrier.

A method for determining whether the resources are in conflict may include at least one of the following:

when the first resource on the first carrier and the second resource on the second carrier are in a same position in time domain, and the first carrier and the second carrier are different, if a terminal device has a multicarrier sending capability, and the multicarrier sending capability supports a band combination of the first carrier and the second carrier, determining that the first resource and the second resource are not in conflict;

when the first resource on the first carrier and the second resource on the second carrier are in different positions in time domain, and the first carrier and the second carrier are different, if a time interval between the first resource on the first carrier and the second resource on the second carrier is greater than a preset time threshold, determining that the first resource and the second resource are not in conflict; and when the first resource on the first carrier and the second resource on the second carrier are on a same carrier, and a time-frequency resource of the first resource on the first carrier and a time-frequency resource of the second resource on the second carrier meet a preset peak-to-average ratio requirement, determining that the first resource and the second resource are not in conflict.

For example, assuming that the first resource is a resource grant 1, and the second resource is a resource grant 2, if a time-frequency resource of the resource grant 1 and a time-frequency resource of the resource grant 2 are in a same position in time domain and on different carriers, the user is required to have a capability of simultaneously performing sending on a plurality of carriers, and the multicarrier sending capability supports a band combination of a carrier 1 and a carrier 2.

If the time-frequency resource of the resource grant 1 and the time-frequency resource of the resource grant 2 are in different positions in time domain and on different carriers, the user may support sending of the resource grant 1 and the resource grant 2 through switching a single-carrier transmitter to different carriers, but this requires a time interval between the time-frequency resources that are selected on the resource grant 1 and the resource grant 2 to be sufficiently long, to meet switching delay requirements of the user on different carriers.

If the time-frequency resource of the resource grant 1 and the time-frequency resource of the resource grant 2 are on a same carrier, the UE needs to determine that the resource grant 1 and the resource grant 2 meet a peak-to-average ratio requirement.

It should be further noted that, the foregoing first preset criterion and the conflict determining may further cause a case in which no suitable resource is selected finally, and then the following processing needs to be performed:

skipping the target data when no resource of the target carrier meets the first preset criterion; and skipping a logical channel to which the target data belongs, and/or a target address to which the target data belongs.

Figure 2:
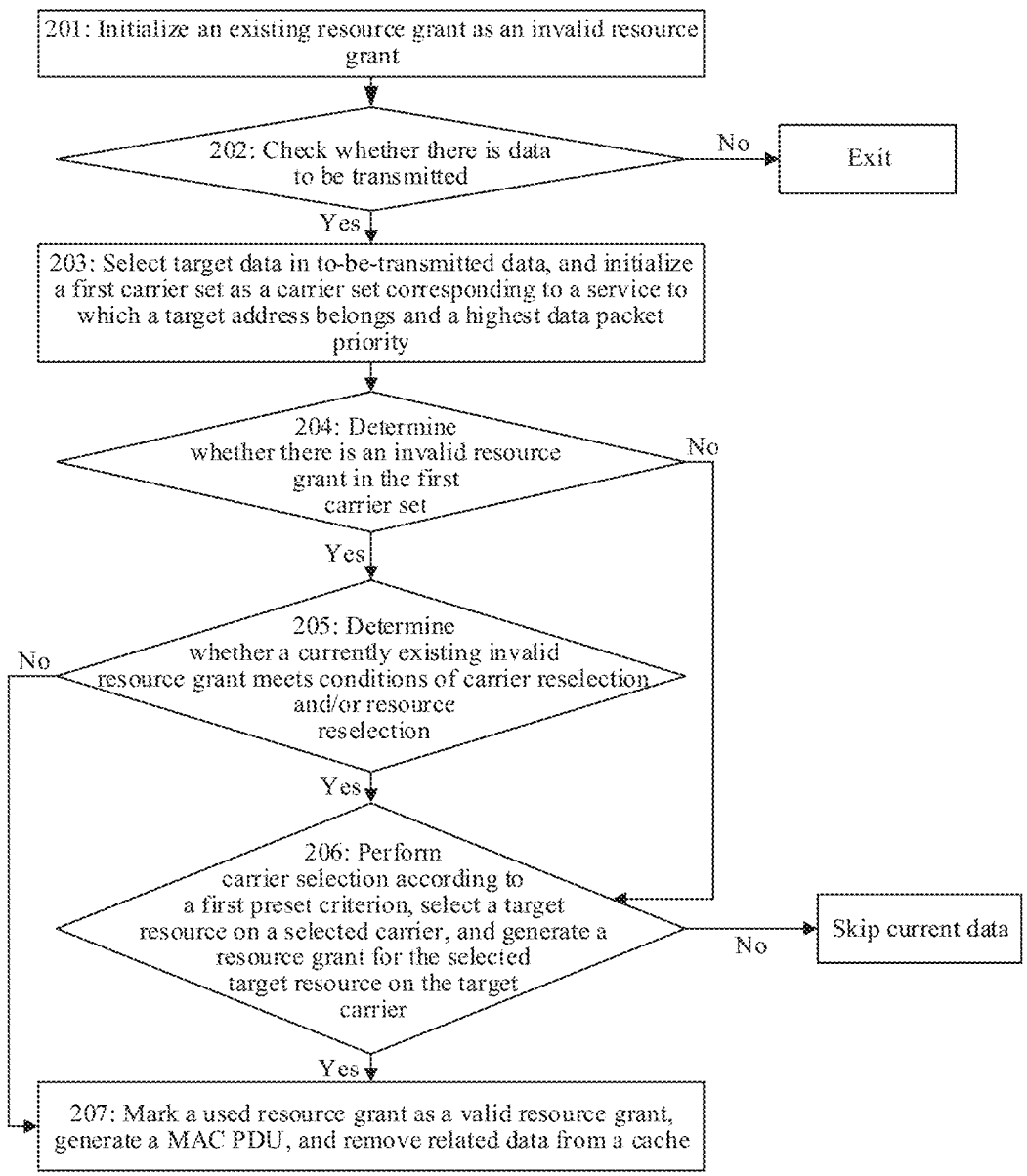
FIG. 2 is a schematic flowchart of a carrier selection method according to an embodiment of the present invention.

A processing flow in this embodiment is further described below with reference to FIG. 2. UE performs the following steps in each time unit to perform resource selection:

Step 201: Initialize an existing resource grant as an invalid resource grant, and initialize a valid resource grant set to be empty.

Step 202: A user checks whether there is data to be transmitted currently, and if yes, performs step 203, otherwise, exits.

Step 203: Select target data in to-be-transmitted data, and initialize a first carrier set as a carrier set corresponding to a service to which a target address belongs and a highest data packet priority.

The selecting target data in to-be-transmitted data may include: according to a logical channel prioritization criterion, preferentially selecting a target address having a highest data packet priority associated with a logical channel including to-be-transmitted data, and preferentially selecting, at the target address, to-be-transmitted data having a highest data packet priority.

Step 204: Determine whether there is an invalid resource grant in the first carrier set, for example, determine whether there is an existing invalid resource grant in the current first carrier set, and if yes, perform step 205, and if not, perform step 206.

Step 205: Determine whether the currently existing invalid resource grant meets conditions of carrier reselection and/or resource reselection, and if yes, perform step 206, and if not, directly use the resource grant, and perform step 208.

Step 206: Perform carrier selection according to a first preset criterion, select a target resource on a selected carrier, and generate a resource grant for the selected target resource on the target carrier, and if the resource grant can be generated, perform step 207: or if the resource grant is not generated, skip current data.

The performing carrier selection according to a first preset criterion includes: performing carrier selection based on CBR measurement values of carriers in the first carrier set. For example, the user selects a carrier having a CBR less than a specific threshold, where the threshold varies for different PPPPs; or the user selects a carrier having a smallest CBR, and when there is an invalid resource grant, a CBR measurement value of the target carrier is less than a preset offset of a current carrier measurement value; otherwise, the user maintains a carrier in which the current invalid resource grant is located unchanged.

The performing carrier selection according to a first preset criterion may further include:

a CBR measurement value of the target carrier being less than a threshold;

the target carrier being capable of carrying a data packet priority PPPP value of the target data;

the target carrier being capable of carrying a service of the target data; and a CBR value of the target carrier being less than a current CBR measurement value and a CBR threshold corresponding to the data packet priority PPPP value of the current target data.

The performing carrier selection according to a first preset criterion may further include: selecting, for low-priority data, a first resource grant on a first carrier, and subsequently selecting, for high-priority data, a second resource grant on a second carrier; determining whether the first resource grant and the second resource grant are in conflict; and if the second resource grant is in conflict with the first resource grant, preferentially transmitting the second resource grant, and discarding the first resource grant.

Alternatively, a first resource grant on a first carrier may be selected for high-priority data, and subsequently a second resource grant that is on a second carrier and is not in conflict with the first resource grant on the first carrier may be selected for low-priority data.

Specifically, the determining whether the two resource grants are in conflict includes:

if a time-frequency resource of a resource grant 1 and a time-frequency resource of a resource grant 2 are in a same position in time domain and on different carriers, the user is required to have a capability of simultaneously sending on a plurality of carriers, and the multicarrier sending capability supports a band combination of a carrier 1 and a carrier 2;

if the time-frequency resource of the resource grant 1 and the time-frequency resource of the resource grant 2 are in different positions in time domain and on different carriers, the user may support sending of the resource grant 1 and the resource grant 2 through switching a single-carrier transmitter to different carriers, but this requires a time interval between the time-frequency resources that are selected on the resource grant 1 and the resource grant 2 to be sufficiently long, to meet switching delay requirements of the user on different carriers; and if the time-frequency resource of the resource grant 1 and the time-frequency resource of the resource grant 2 are on a same carrier, the UE needs to determine that the resource grant 1 and the resource grant 2 meet a peak-to-average ratio requirement.

When a resource grant can be generated for the target carrier, the resource grant is determined to be used, and a MAC PDU is generated; otherwise, the target carrier is removed from the first carrier set. A specific process is: if a resource grant can be generated, determining that the resource grant is to be used, and performing step 208; otherwise, removing the target carrier from the first carrier set.

For the skipping current data, the skipping the target data means that for a current time, no resource is selected for a logical channel to which the target data belongs, and/or a target address to which the target data belongs; however, resources may still be selected for other logical channels than the logical channel to which the target data belongs, and/or other target addresses than the target address to which the target data belongs for transmission, even if the other logical channels than the logical channel to which the target data belongs, and/or the other target addresses than the target address to which the target data belongs have priorities less than a priority of the logical channel to which the target data belongs, and/or the target address to which the target data belongs.

Step 207: Mark the used resource grant as a valid resource grant, generate a MAC PDU, and remove related data from a cache.

The determining whether to remove the target carrier from the first carrier set may be understood as: when no available resource is found on a carrier, the carrier may be removed.

Further, a basis may be, for example, determining that the target carrier is to be removed from the carrier set if a quantity of valid resource grants on a current carrier is greater than or equal to a CBR threshold, where the (valid) resource grants on the current carrier reach or exceed a CBR limit; or removing the target carrier from the carrier set if valid resource grants on a current carrier reach a supported resource grant quantity, where the (valid) resource grants on the current carrier reach a resource grants quantity supportable by the user, and subsequently, returning to step 202.

It can be seen that, by using the foregoing technical solution, resource selection can be performed for target data according to a priority of the target data, and then data transmission between UEs is performed on a selected resource of a carrier. In this way, a problem of how to receive and transmit data when UE performs multicarrier data transmission can be resolved.

Embodiment 2

Figure 3:
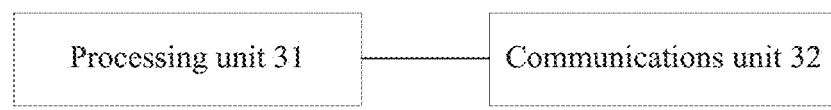
FIG. 3 is a schematic structural composition diagram of UE according to an embodiment of the present invention.

This embodiment of the present invention provides UE. As shown in FIG. 3, the UE includes:

a processing unit 31, configured to select, for target data, a resource on a target carrier according to a first preset criterion, where the first preset criterion includes at least: preferentially selecting the resource for high-priority target data; and a communications unit 32, configured to perform data transmission between UEs based on the selected resource of the target carrier.

There may be at least one piece of target data. That is, there may be a plurality of pieces of target data, and a quantity of the target data is not described in detail herein.

Further, a manner of determining a priority of the target data may include at least one of the following:

for two logical channels for which a PDCP copy operation is performed, data of a first logical channel is used as higher-priority data, and data of a second logical channel is used as lower-priority data;

data corresponding a target address including a logical channel associated with a high data packet priority PPPP has a high priority; and at the target address, data corresponding to the logical channel associated with the high data packet priority PPPP has a high priority.

Specifically, the high priority may be represented by using PPPP, that is, a lower PPPP value represents a higher priority.

The high priority may be represented by using copying/non-copying data. That is, for a specific bearer for performing a PDCP copy operation (that is, the bearer is divided into two logical channels, serving two PDCP PDU copies of the bearer). Only after to-be-transmitted data of one logical channel is completely allocated, data is allocated to the other logical channel. The UE determines a first logical channel and a second logical channel in the two logical channels. Priorities of the two logical channels may be determined according to whether there is to-be-transmitted data in a logical channel. For example, a logical channel in which there is to-be-transmitted data may be defined as a high-priority logical channel; otherwise, a logical channel may be defined as a low-priority logical channel.

That is, after a user allocates a first carrier set to to-be-transmitted data of one logical channel having a high priority, the user may allocate, from carriers outside the first carrier set, a carrier to to-be-transmitted data of the other logical channel having a low priority.

That the target address of a high-priority logical channel corresponds to high-priority data may be determined according to priorities of different target addresses. In addition, at each target address, there may be logical channels having different priorities. A priority of target data is determined based on a priority of a logical channel.

In that data corresponding a target address including a logical channel associated with a high data packet priority PPPP has a high priority, a logical channel associated with a data packet priority means that each logical channel is associated with one data packet priority value PPPP. Such an association relationship is determined by the UE, and different logical channels may be associated with a same PPPP.

The high data packet priority PPPP means that a lower PPPP value represents a higher priority.

When carrier selection is performed, a carrier is selected according to a particular condition. The first preset criterion further includes at least one of the following:

a CBR measurement value of the target carrier being less than a threshold;

the target carrier being capable of carrying a data packet priority PPPP value of the target data;

the target carrier being capable of carrying a service of the target data;

a CBR value of the target carrier being less than a current CBR measurement value and a CBR threshold corresponding to the data packet priority PPPP value of the current target data; and a quantity of resource grants on the target carrier being less than a resource grant quantity threshold.

Certainly, there may be other criteria, which are not enumerated in this embodiment.

Further, the processing unit 31 selects, for low-priority data, a first resource on a first carrier, and subsequently selects, for high-priority data, a second resource on a second carrier; determines whether the first resource and the second resource are in conflict; and if the second resource is in conflict with the first resource, preferentially transmits the second resource, and discards the first resource.

That is, a sequence of resource allocation performed on high-priority or low-priority target data may be set according to an actual situation. The manner described above is a manner in which the low-priority data is allocated a resource first and then the high-priority data is allocated a resource. In this manner, whether the two resources are in conflict needs to be further determined. If the two resources are in conflict, a low-priority resource needs to be discarded, and a high-priority resource is transmitted.

Another manner is: the processing unit 31 selecting, for high-priority data, a first resource on a first carrier, and subsequently selecting, for low-priority data, a second resource on a second carrier that is not in conflict with the first resource on the first carrier.

A method for determining whether the resources are in conflict may include at least one of the following:

when the first resource on the first carrier and the second resource on the second carrier are in a same position in time domain, and the first carrier and the second carrier are different, if a terminal device has a multicarrier sending capability, and the multicarrier sending capability supports a band combination of the first carrier and the second carrier, determining that the first resource and the second resource are not in conflict;

when the first resource on the first carrier and the second resource on the second carrier are in different positions in time domain, and the first carrier and the second carrier are different, if a time interval between the first resource on the first carrier and the second resource on the second carrier is greater than a preset time threshold, determining that the first resource and the second resource are not in conflict; and when the first resource on the first carrier and the second resource on the second carrier are on a same carrier, and a time-frequency resource of the first resource on the first carrier and a time-frequency resource of the second resource on the second carrier meet a preset peak-to-average ratio requirement, determining that the first resource and the second resource are not in conflict.

For example, assuming that the first resource is a resource grant 1, and the second resource is a resource grant 2, if a time-frequency resource of the resource grant 1 and a time-frequency resource of the resource grant 2 are in a same position in time domain and on different carriers, the user is required to have a capability of simultaneously performing sending transmitting on a plurality of carriers, and the multicarrier sending capability supports a band combination of a carrier 1 and a carrier 2.

If the time-frequency resource of the resource grant 1 and the time-frequency resource of the resource grant 2 are in different positions in time domain and on different carriers, the user may support sending of the resource grant 1 and the resource grant 2 through switching a single-carrier transmitter to different carriers, but this requires a time interval between the time-frequency resources that are selected on the resource grant 1 and the resource grant 2 to be sufficiently long, to meet handover switching requirements of the user on different carriers.

If the time-frequency resource of the resource grant 1 and the time-frequency resource of the resource grant 2 are on a same carrier, the UE needs to determine that the resource grant 1 and the resource grant 2 meet a peak-to-average ratio requirement.

It should be further noted that, the foregoing first preset criterion and the conflict determining may further cause a case in which no suitable resource is selected finally, and then the following processing needs to be performed:

skipping the target data when no resource of the target carrier meets the first preset criterion; and skipping a logical channel to which the target data belongs, and/or a target address to which the target data belongs.

A processing flow in this embodiment is further described below. UE performs the following steps in each time unit to perform resource selection:

A processing unit 31 initializes an existing resource grant as an invalid resource grant, and initializes a valid grant set to be empty.

A user checks whether there is data to be transmitted currently, and if yes, performs step 203; otherwise, exits.

The processing unit 31 selects target data in to-be-transmitted data, and initializes a first carrier set as a carrier set corresponding to a service to which a target address belongs and a highest data packet priority.

The selecting target data in to-be-transmitted data may include: according to a logical channel prioritization criterion, preferentially selecting a target address having a highest data packet priority associated with a logical channel including to-be-transmitted data, and preferentially selecting, at the target address, to-be-transmitted data having a highest data packet priority.

The processing unit 31 determines whether there is an invalid resource grant. For example, the processing unit 31 determines whether there is an existing invalid resource grant in the current first carrier set, and if yes, determines whether the currently existing invalid resource grant meets conditions of carrier reselection and/or resource reselection, and if not, performs carrier selection based on CBR measurement values of carriers; otherwise, directly uses the resource grant, generates a MAC PDU, and removes the authorized resource from a cache.

The processing unit 31 determines whether the currently existing invalid resource grant meets conditions of carrier reselection and/or resource reselection, and if yes, performs carrier selection based on CBR measurement values of carriers; otherwise, directly uses the resource grant; and if the resource grant is not directly used, marks a used resource grant as a valid resource grant, generates a MAC PDU, and removes related data from the cache.

The performing carrier selection based on CBR measurement values of carriers; otherwise, directly using the resource grant, generating a MAC PDU, and removing the authorized resource from a cache is: performing carrier selection based on CBR measurement values of carriers. For example, the user selects a carrier having a CBR less than a specific threshold, where the threshold varies for different PPPPs; or the user selects a carrier having a smallest CBR, and when there is an invalid resource grant, a CBR measurement value of the target carrier is less than a preset offset of a current carrier measurement value; otherwise, the user maintains a carrier in which the current invalid resource grant is located unchanged.

The processing unit 31 performs carrier selection according to a first preset criterion, selects a target resource on a selected carrier, and generates a resource grant for the selected target resource on the target carrier; performs resource selection on the selected carrier, and generates resource grant, where the resource grant should not be in conflict with an grant in the valid resource grant set; and if the resource grant is not generated, skips current data.

The performing carrier selection according to a first preset criterion includes: performing carrier selection based on CBR measurement values of carriers in the first carrier set. For example, the user selects a carrier having a CBR less than a specific threshold, where the threshold varies for different PPPPs; or the user selects a carrier having a smallest CBR, and when there is an invalid resource grant, a CBR measurement value of the target carrier is less than a preset offset of a current carrier measurement value; otherwise, the user maintains a carrier in which the current invalid resource grant is located unchanged.

The performing carrier selection according to a first preset criterion may further include:

a CBR measurement value of the target carrier being less than a threshold;

the target carrier being capable of carrying a data packet priority PPPP value of the target data;

the target carrier being capable of carrying a service of the target data; and a CBR value of the target carrier being less than a current CBR measurement value and a CBR threshold corresponding to the data packet priority PPPP value of the current target data.

The performing carrier selection according to a first preset criterion may further include: selecting, for low-priority data, a first resource grant on a first carrier, and subsequently selecting, for high-priority data, a second resource grant on a second carrier; determining whether the first resource grant and the second resource grant are in conflict; and if the second resource grant is in conflict with the first resource grant, preferentially transmitting the second resource grant, and discarding the first resource grant.

Alternatively, a first resource grant on a first carrier may be selected for high-priority data, and subsequently a second resource grant that is on a second carrier and is not in conflict with the first resource grant on the first carrier may be selected for low-priority data.

Specifically, the determining whether the two resource grants are in conflict includes:

if a time-frequency resource of a resource grant 1 and a time-frequency resource of a resource grant 2 are in a same position in time domain and on different carriers, the user is required to have a capability of simultaneously sending on a plurality of carriers, and the multicarrier sending capability supports a band combination of a carrier 1 and a carrier 2;

if the time-frequency resource of the resource grant 1 and the time-frequency resource of the resource grant 2 are in different positions in time domain and on different carriers, the user may support sending of the resource grant 1 and the resource grant 2 through switching a single-carrier transmitter to different carriers, but this requires a time interval between the time-frequency resources that are selected on the resource grant 1 and the resource grant 2 to be sufficiently long, to meet switching delay requirements of the user on different carriers; and if the time-frequency resource of the resource grant 1 and the time-frequency resource of the resource grant 2 are on a same carrier, the UE needs to determine that the resource grant 1 and the resource grant 2 meet a peak-to-average ratio requirement.

When a resource grant can be generated for the target carrier, the resource grant is determined to be used, and a MAC PDU is generated; otherwise, the target carrier is removed from the first carrier set. A specific process is: if a resource grant can be generated, determining that the resource grant is to be used; otherwise, removing the target carrier from the first carrier set.

For the skipping current data, the skipping the target data means that for a current time, no resource is selected for a logical channel to which the target data belongs, and/or a target address to which the target data belongs; however, resources may still be selected for other logical channels than the logical channel to which the target data belongs, and/or other target addresses than the target address to which the target data belongs for transmission, even if the other logical channels than the logical channel to which the target data belongs, and/or the other target addresses than the target address to which the target data belongs have priorities less than a priority of the logical channel to which the target data belongs, and/or the target address to which the target data belongs.

The processing unit 31 marks the used resource grant as a valid grant, generates a MAC PDU, and removes related data from the cache.

The determining whether to remove the target carrier from the first carrier set may be understood as: when no available resource is found on a carrier, the carrier may be removed.

Further, a basis may be, for example, determining that the target carrier is to be removed from the carrier set if a quantity of valid resource grants on a current carrier is greater than or equal to a CBR threshold, where the (valid) resource grants on the current carrier reach or exceed a CBR limit; or removing the target carrier from the carrier set if valid resource grants on a current carrier reach a supported resource grant quantity, where the (valid) resource grants on the current carrier reach a resource grant quantity supportable by the user.

Figure 4:
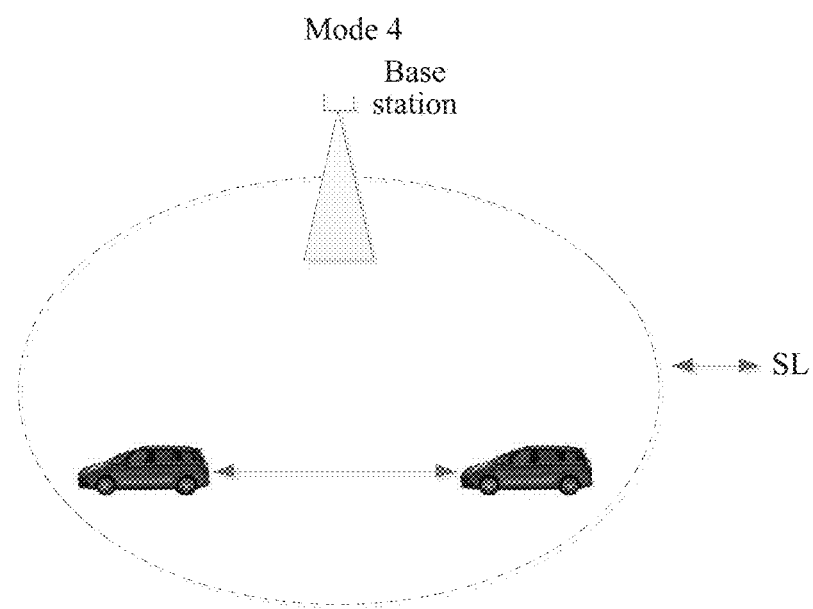
FIG. 4 is a schematic diagram of a scenario according to an embodiment of the present invention.

It needs to be understood that the solutions provided in this embodiment may be mainly applied to a scenario shown in FIG. 4. In a mode 4, a vehicle terminal uses a sensing+reservation transmission manner. The vehicle terminal obtains an available transmission resource set in a resource pool through sensing. The terminal randomly selects an SL (bypass) resource from the set to transmit data. Because services in an Internet of Vehicles system have a periodicity feature, the terminal generally uses a semi-static transmission manner. That is, after selecting a transmission resource, the terminal continually uses the resource in a plurality of transmission cycles, thereby reducing probabilities of resource reselection and resource conflict.

It can be seen that, by using the foregoing technical solution, resource selection can be performed for target data according to a priority of the target data, and then data transmission between UEs is performed on a selected resource of a carrier. In this way, a problem of how to receive and transmit data when UE performs multicarrier data transmission can be resolved.

Figure 5:
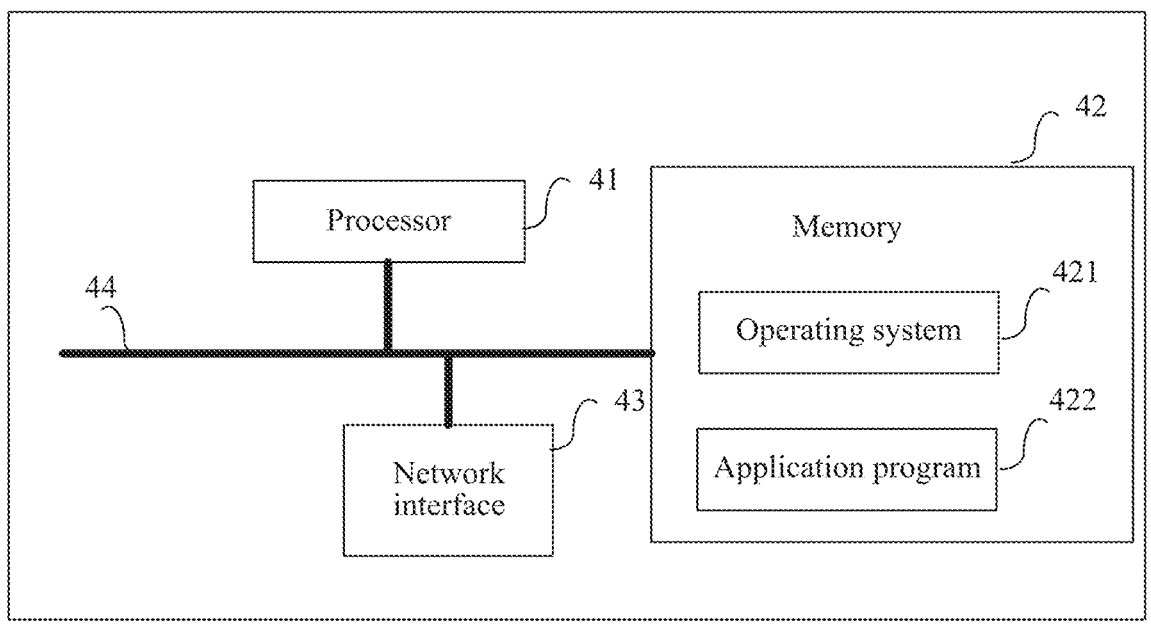
FIG. 5 is a schematic diagram of a hardware architecture according to an embodiment of the present invention.

An embodiment of the present invention further provides a hardware composition architecture of UE. As shown in FIG. 5, the UE includes at least one processor 41, a memory 42, and at least one network interface 43. All the components are coupled together by using a bus system 44. It may be understood that, the bus system 44 is configured to implement connection and communication between the components. The bus system 44 further includes a power supply bus, a control bus, and a status signal bus in addition to a data bus. However, for clear description, various types of buses in FIG. 5 are marked as the bus system 44.

It may be understood that the memory 42 in this embodiment of the present invention may be a volatile memory or a nonvolatile memory, or may include a volatile memory and a nonvolatile memory.

In some implementations, the memory 42 stores the following elements: an executable module or a data structure, or a subset thereof, or an extended set thereof:

an operating system 421 and an application program 422.

The processor 41 is configured to process the method steps in Embodiment 1. Details are not described herein again.

An embodiment of the present invention provides a computer storage medium. The computer storage medium stores a computer executable instruction, and when executed, the computer executable instruction implements the method steps in Embodiment 1.

When the foregoing apparatus in the embodiments of the present invention is implemented in a form of a software functional module and sold or used as an independent product, the apparatus may alternatively be stored in a computer-readable storage medium. Based on such an understanding, the technical solutions of the embodiments of the present invention essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present invention. The foregoing storage medium includes: any medium that can store program code, such as a USB flash drive, a removable hard disk, a read-only memory (ROM), a magnetic disk, or a compact disc. In this way, the embodiments of the present invention are not limited to any specific combination of hardware and software.

Correspondingly, an embodiment of the present invention further provides a computer storage medium storing a computer program, and the computer program is configured to perform a data scheduling method in this embodiment of the present invention.

Although preferred embodiments of the present invention are disclosed for an exemplary objective, a person skilled in the art may be aware of various possible modifications, additions, and replacements. Therefore, the scope of the present invention shall not be limited to the foregoing embodiments.

What is claimed is:

1. A method for resource allocation, applied to user equipment (UE), the method comprising:
   selecting a target address, wherein the target address is a destination associated with a sidelink logical channel with a highest priority;
   selecting, from sidelink logical channels belonging to the target address, the sidelink logical channel with the highest priority, wherein the priority of the logical channel is associated with a ProSe Per Packet Priority (PPPP) and the logical channel with high priority is associated with high PPPP;
   allocating a resource for data in the sidelink logical channel with the highest priority.

2. The method according to claim 1, wherein the allocating resources for data in the sidelink logical channel with the highest priority, comprises:
   allocating resources on a target carrier.

3. The method according to claim 2, wherein a channel busy ratio (CBR) measurement value of the target carrier is below a threshold.

4. The method according to claim 2, wherein the target carrier is allowed to carry a service of the data.

5. The method according to claim 2, further comprising:
   after allocating, for data in the sidelink logical channel with the highest priority, a first resource on the target carrier,
   allocating, for data in a sidelink logical channel with a lower priority, a second resource on the target carrier.

6. The method according to claim 2, wherein the target carrier is determined based on a carrier selection or reselection procedure.

7. The method according to claim 6, wherein the carrier selection or reselection procedure comprises:
   when there is a resource grant, determining whether the resource grant meets conditions of carrier selection or reselection;
   and the method further comprising:
   if the resource grant meets conditions of carrier selection or reselection, performing carrier selection or reselection based on CBR measurement values of carriers.

8. The method according to claim 6, wherein the carrier selection or reselection procedure comprises:
   when there is no resource grant, performing carrier selection or reselection based on CBR measurement values of carriers.

9. The method according to claim 8, wherein the performing carrier selection or reselection based on the CBR measurement values of the carriers comprises at least one of the following:
   selecting a carrier having a CBR below a preset CBR threshold, wherein the CBR threshold is associated with the PPPP; or
   selecting a carrier having a smallest CBR.

10. The method according to claim 2, further comprising:
    generating a resource grant on the target carrier.

11. An apparatus in a communication device, comprising: a processor and a memory configured to store a computer program executable on the processor, wherein the processor is configured to, when running the computer program,
    select a target address, wherein the target address is a destination associated with a sidelink logical channel with a highest priority;
    select, from sidelink logical channels belonging to the target address, the sidelink logical channel with the highest priority, wherein the priority of the logical channel is associated with a ProSe Per Packet Priority (PPPP) and the logical channel with high priority is associated with high PPPP;
    allocate a resource for data in the sidelink logical channel with the highest priority.

12. The apparatus according to claim 11, wherein the processor is further configured to:
    allocate resources on a target carrier.

13. The apparatus according to claim 12, wherein a channel busy ratio (CBR) measurement value of the target carrier is below a threshold.

14. The apparatus according to claim 12, wherein the target carrier is allowed to carry a service of the data.

15. The apparatus according to claim 12, wherein the processor is further configured to:
    after allocating, for data in the sidelink logical channel with the highest priority, a first resource on the target carrier,
    allocate, for data in a sidelink logical channel with a lower priority, a second resource on the target carrier.

16. The apparatus according to claim 12, wherein the target carrier is determined based on a carrier selection or reselection procedure.

17. The apparatus according to claim 16, wherein the processor is further configured to:
    when there is a resource grant, determine whether the resource grant meets conditions of carrier selection or reselection;
    if the resource grant meets conditions of carrier selection or reselection, perform carrier selection or reselection based on CBR measurement values of carriers.

18. The apparatus according to claim 16, wherein the processor is further configured to:
    when there is no resource grant, perform carrier selection or reselection based on CBR measurement values of carriers.

19. The apparatus according to claim 18, wherein the performing carrier selection or reselection based on the CBR measurement values of the carriers comprises at least one of the following:
    selecting a carrier having a CBR below a preset CBR threshold, wherein the CBR threshold is associated with the PPPP; or
    selecting a carrier having a smallest CBR.

20. The apparatus according to claim 12, wherein the processor is further configured to:
    generate a resource grant on the target carrier.

* * * * *